May 16, 1933.  F. GIRG  1,908,747
METHOD OF MANUFACTURING DIFFERENTLY COLORED
MARBLED, VEINED, OR STREAKY SPONGE RUBBER
Filed March 3, 1932
*Fig.1*
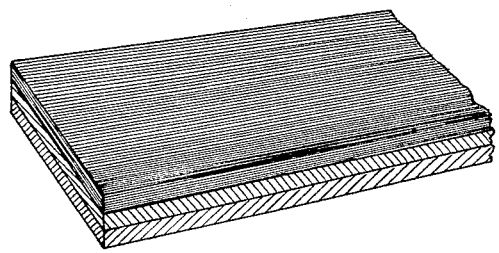
*Fig.4*
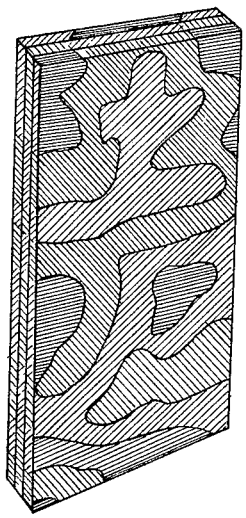
*Fig.2*
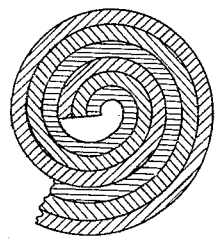
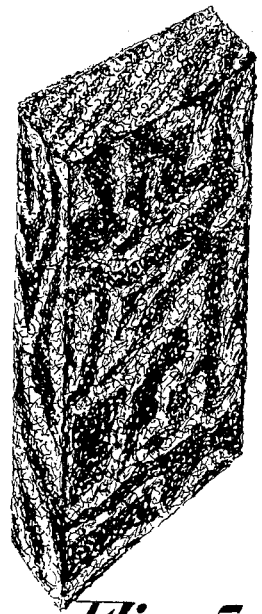
*Fig.3*
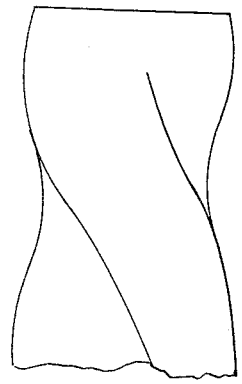
*Fig.5*
F. Girg.
INVENTOR
By: Marks & Clerk
Attys.

Patented May 16, 1933

1,908,747

UNITED STATES PATENT OFFICE

FRANZ GIRG, OF BRATISLAVA-PETRZALKA, CZECHOSLOVAKIA, ASSIGNOR TO GUMMI- UND BALATAWERKE MATADOR AKTIENGESELLSCHAFT, OF BRATISLAVA-PETRZALKA, CZECHOSLOVAKIA, A COMPANY OF CZECHOSLOVAKIA

METHOD OF MANUFACTURING DIFFERENTLY COLORED MARBLED, VEINED, OR STREAKY SPONGE RUBBER

Application filed March 3, 1932. Serial No. 596,657.

Methods of manufacturing differently colored rubber articles from solid rubber rolled out into thin plates are known, consisting in rolling up together plates of different colors, twisting the rolls, drawing the latter out into ropes and subsequently uniting them. It has also been proposed, by introducing compressed gas into vulcanizing moulds filled with such multicolored rubber, to produce nonuniformly porous sponge rubber. It has not hitherto been possible in this manner, however, to produce marbled or veined sponge rubber of uniform porosity, that is to say a rubber, the primary material of which contains gas-forming substances.

This is only rendered possible when proper consideration is paid to the behavior of the individual coloring matters and to the tumefying and softening agents serving for producing the spongy condition. In accordance with the present invention, for the purpose of manufacturing differently colored, marble, veined or streaky sponge rubber, differently colored primary materials are joined together, to which the required colors and the swelling medium consisting of gas-forming and softening agents suitable to the nature of the individual colors or dyes have previously been added, the quantities of which are so proportioned that the individual primary masses have different consistencies.

The steps of carrying out the method according to the present invention are illustrated by way of example on the accompanyin sheet of drawing in which:—

Fig. 1 shows three superposed thin plates of different colors.

Fig. 2 illustrates a roll consisting of the said plates.

Fig. 3 shows a twisted roll,

Fig. 4 plates laid side by side, and

Fig. 5 the rubber in the finished state.

The rubber masses thus prepared are drawn out into thin plates or sheets, the differently colored sheets in the solid or semi-liquid state are superposed (Fig. 1) and rolled up together to form a compact roll (Fig. 2), which is then mechanically twisted (Fig. 3) and again rolled out into strips. The strips thus produced are laid side by side (Fig. 4) and united to form a plate, which is then placed in the desired mould and vulcanized (Fig. 5). In order to obtain more or less sharply defined planes of separation between the individual layers of different colors when producing different-colored grainings or marblings, it is advisable to subject the differently colored unvulcanized mixtures, which have been drawn into plates, to superficial cold or hot vulcanization on one or both sides and then to combine the plates. By taking proper account of the nature of the additions and selecting suitable additions in the preparation of the primary materials for the individual colors, a very uniformly porous and unified sponge rubber will be obtained on vulcanization.

Thus, for instance a white-blue marbling or a white sponge with blue grain is obtained by adding equal quantities of tumefying or raising medium to both masses, the raising medium added to the white mass containing 15% gas-forming substances and 2% softening medium, while the raising medium added to the blue mass contains 12% gas-forming substances and 5% softening medium. Without suitable proportioning or grading of the raising or tumefying medium, it is not possible to obtain sharply defined marbling or a uniformly porous final product. The color effects are controlled by keeping the quantities of the colored substances employed to obtain the desired marbling in a definite proportion to the quantity of the base mass; thus 10 kilograms white base mass and 2½ kilograms blue mass are rolled in correspondingly thin layers in the form of a softer blue mass between the solid white mass.

For instance a white-blue marbled sponge rubber or a white sponge with blue graining is produced according to the present process as follows: There are employed as raw material: a rubber mixture comprising 50 parts by weight of raw rubber, 6 parts by weight of castor oil, 2 parts by weight of sulfur, 15 parts by weight chalk, 10 parts by weight zinc white, a white mass of 17 parts by weight of lithopone and a blue mass of 16 parts by weight of heavy spar and 1 part by weight of blue coloring matter; ½ part by weight of an accelerating agent. Then follows the addition of the raising and softening agents: for 10 kilograms white mass, there are the following raising agents: 600 grams alcohol 90%, 900 grams of a solution of ammonium carbonate as softening agent, 20 grams amyl acetate and 180 grams benzine. For 10 kilograms blue mass, there are the following raising agents: 480 grams alcohol, 720 grams of a solution of ammonium carbonate as softening agent, 50 grams amyl acetate and 450 grams benzine. The masses thus prepared are drawn out into plates as already described and in this case the white mass to a thickness of about 6 millimeters but the blue mass to a thickness of 1.5 to 2 millimeters. Four of such plates are then superposed and rolled, then twisted by hand or mechanically and again rolled out into strips. The further operations have already been described above.

By suitable choice of the thickness of the individual plates or by employing rolls of smaller and larger diameter or by a harder or more gentle twisting, the pattern of the final product can be varied at will.

I claim:—

1. A method of manufacturing differently colored marbled, veined or streaky sponge rubber, which consists in combining together colored primary masses to which the gas-forming substances comprising solution of ammonium carbonate constituting a swelling medium suitable for the particular colors employed have previously been added, the quantities of which have been graded to produce the required effect, so that the individual primary masses have also a different consistency imparted to them in order to produce marbling, the steps of the method consisting in drawing out said masses into thin sheets, superposing the sheets to form layers of different colors, rolling up together the superposed layers, twisting the roll thus formed, rolling out into strips the twisted roll, laying the strips side by side to form a plate, and vulcanizing the latter in a suitable mould.

2. A method of manufacturing white and blue colored marbled and streaky sponge rubber of uniform porosity, which method consists in first preparing a primary rubber mass comprising the mixing of the following ingredients by weight, 50 parts raw rubber, 6 parts castor oil, 2 parts sulfur, 15 parts chalk and 10 parts zinc white, then dividing said mass into equal portions and adding to one portion to form the white element, 17 parts lithopone, and to the other portion to form the colored element, 16 parts heavy spar and one part of coloring matter; subsequently adding swelling agents to each of said elements; then drawing out each of said elements separately to form thin sheets, then alternating said sheet elements and twisting the resultant mass, then rolling the twisted mass to form a plate and finally vulcanizing the plate.

3. A method of manufacturing streaky sponge rubber as described in claim 2, in which the swelling agents for 10,000 parts by weight of said first element comprise about 600 parts by weight of 90% alcohol, 900 parts of solution of ammonium carbonate, 20 parts of amyl acetate and 100 parts of benzene; the swelling agents for 10,000 parts by weight of said second element comprise about 480 parts by weight of alcohol, 720 parts of solution of ammonia carbonate, 50 parts amyl acetate and 450 parts benzene.

4. A method of manufacturing streaky sponge rubber as described in claim 2, in which the swelling agents for 10,000 parts of each of said elements comprise from 600 to 480 parts of 90% alcohol, 900 to 720 parts of solution of ammonia carbonate, 20 to 50 parts of amyl acetate and 100 to 450 parts of benzene, all by weight.

In testimony whereof I affix my signature.

FRANZ GIRG.